US007251093B2

(12) United States Patent
Biskeborn

(10) Patent No.: US 7,251,093 B2
(45) Date of Patent: Jul. 31, 2007

(54) TAPE SYSTEM WITH ADJUSTABLE WRAP ANGLES AND METHOD FOR ADJUSTING TAPE WRAP ANGLE

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/158,834

(22) Filed: Jun. 21, 2005

(65) Prior Publication Data

US 2005/0237652 A1    Oct. 27, 2005

Related U.S. Application Data

(60) Continuation of application No. 10/742,354, filed on Dec. 19, 2003, now Pat. No. 6,937,409, which is a division of application No. 09/591,696, filed on Jun. 9, 2000, now Pat. No. 6,700,733.

(51) Int. Cl.
*G11B 21/04* (2006.01)
*G11B 15/18* (2006.01)
*G11B 15/00* (2006.01)
*G11B 15/60* (2006.01)

(52) U.S. Cl. .................... 360/70; 360/69; 360/90; 360/130.21

(58) Field of Classification Search ............... None
See application file for complete search history.

(56) References Cited

U.S. PATENT DOCUMENTS 4,112,472 A  *  9/1978  Hauke et al. ................. 360/84
4,122,504 A  * 10/1978  Prozzo et al. ................ 360/90
5,906,644 A  *  5/1999  Powell ..................... 623/20.15
6,405,957 B1 *  6/2002  Alexander et al. .......... 242/346

* cited by examiner

*Primary Examiner*—Andrea Wellington
*Assistant Examiner*—Jason Olson
(74) *Attorney, Agent, or Firm*—Zilka-Kotab, PC

(57) ABSTRACT

A method for adjusting a tape wrap angle is described comprising the steps of operating the tape system to generate or regenerate an electrical signal in the head from the tape, either increasing or reducing the tape wrap angle as appropriate until a signal from the tape head reappears or goes to zero, then increasing the wrap angle until the desired angle is achieved as measured by the signal from the head or by moving the tape support a fixed amount. A tape recording and/or reading system with adjustable wrap angles is described which can be used with a method of the invention. The system includes one or more rollers mounted on an adjustable shaft with an eccentric or axially offset portion supporting the roller. Preferably for a magnetic head, an adjustable shaft and roller are located on the tape-in and tape-out side of the tape head. The angular orientation of the eccentric shaft is adjustable, thereby, allowing precise adjustment of the position of the roller with respect to the tape head. Rotating the shaft moves the eccentric portion of the shaft further behind or closer to the head and, therefore, causes the roller mounted on the eccentric portion of the shaft to move similarly resulting in a change in the corresponding wrap angle of the tape in relation to the head. When the desired wrap angle is achieved, the shaft can be restrained from further rotation by an appropriate friction or other locking means. Although the invention can be used with any type of tape head, it is used to particular advantage with flat contour tape recording heads.

16 Claims, 5 Drawing Sheets

TAPE SYSTEM WITH ADJUSTABLE WRAP ANGLES AND METHOD FOR ADJUSTING TAPE WRAP ANGLE

RELATED APPLICATIONS

This application is a continuation of U.S. patent application Ser. No. 10/742,354 filed Dec. 19, 2003 now U.S. Pat. No. 6,937,409, which is a divisional of Ser. No. 09/591,696 filed Jun. 9, 2000 and now U.S. Pat. No. 6,700,733.

FIELD OF THE INVENTION

The invention relates to the field of recording tape transport mechanisms and more particularly to means for supporting, positioning and adjusting the tape in relation to the tape head.

BACKGROUND OF THE INVENTION

Magnetic tape storage systems are widely used in computer systems for storing and retrieving large amounts of data. A typical system will be described, but the following description should not be taken to encompass the variety of systems available. Current systems typically read and write from parallel tracks on the tape which vary in number based on the design of the system. Each track of the head has a read and a write magnetic transducer (head) arranged in tandem so that the data written by the write head can be verified by the read head. The head pairs may be alternated so that one set of the tracks are written and read when the tape travels in the one direction and the other set is used when the tape is moving in the opposite direction.

Some tapes are written with magnetic servo information thereon to allow positioning the heads in relation to the tracks. All tapes have a magnetic noise floor which is present even when the tape is erased. Therefore, even a tape with no data recorded thereon will generate a noise signal in the read heads and tapes with servo information will also generate signals corresponding to servo information.

For high density recording the tape must be precisely positioned and tensioned as it moves across the head assembly. The tape is typically supported and positioned by support surfaces, for example cylindrical rollers or posts or guides disposed on each side of the head. The support surfaces are positioned behind the head to form the wrap angles which are the angles of the plane of the tape with respect to the air bearing surfaces of the head. Precise wrap angles are necessary for optimum performance.

U.S. Pat. No. 3,123,811 (Mutziger) describes a tape system which has pairs of physically separate heads disposed in a confronting position. The tape is directed through a capstan and pinch roller combination and sequentially over the first pair of heads. The tape then loops around a roller in 180 degree turn and, passes sequentially over the second pair of heads. The problem being addressed by Mutziger is that there is a need to synchronize the signals read by the first pair of heads with the signals from the second pair of heads. One source of error in the described system is, of course, in the precise placement of the heads. Mutziger solves the problem by positioning an eccentrically mounted tape guide between the head pairs. The tape travel between the heads in the first pair is straight. The eccentric tape guide is used to deflect and, thereby, lengthen the tape path between the heads in the second pair. The eccentric tape guide is rotated to adjust the precise length of the tape between the second pair of heads to synchronize signals being read from tape. After desired adjustment is obtained, the eccentric tape guide is locked in place to prevent rotation.

Components and methods which increase the precision of the wrap angle are needed in the art.

SUMMARY OF THE INVENTION

The invention includes a method for adjusting tape wrap angles and a tape recording and/or reading system with a mechanism allowing adjustment of the wrap angles. The invention to heads including single bump and multibump heads. The specific method for adjusting a tape wrap angle depends on how the tape wraps the head. If as is typical for a two or multibump head, the tape wrap angles on the interior edges are fixed during head assembly, then the adjustment is performed for the outside edges. In this case the method for adjusting the outside tape wrap angle comprises the steps of monitoring a signal generated when tape is transported across the head assembly under test from support towards head, reducing the tape wrap angle on the outside edge until the signal from the tape head vanishes, then increasing the wrap angle by moving the tape support a fixed amount, such as might be determined mathematically using the point at which the signal vanishes. Alternatively, in some cases it is possible to adjust the wrap angle until the desired angle is achieved as measured by the signal from the head. Another method is to first adjust the tape wrap angle to nearly zero on both sides of the head using the above method. In fact some head assemblies may even be constructed so that the wrap angle is zero on one side. Then the exterior tape wrap angle can be adjusted by monitoring the signal with tape moving from the guide towards the head, as above, but now it is possible to use in the wrap angle calculation either the point at which signal is lost, or the point at which signal is recovered, as both are well defined and repeatable for a flat contour head. For cylindrical or convex heads when both sides of the module under test are wrapped, the procedure consists in moving tape from module under test towards the guide and unwrapping the tape until the signal first reaches a peak then diminishes. This point can then be used to calculate the optimum wrap angle. The tape system of the invention, preferably includes an adjustment mechanism located on each side (tape-in and tape-out) of the tape head. The adjustment mechanism comprises at least one roller or guide mounted on an adjustable shaft with an eccentric or axially offset portion supporting the roller or guide. The angular orientation of the eccentric shaft is adjustable, thereby allowing precise adjustment of the position of the roller with respect to the tape head assembly. Rotating the shaft moves the eccentric portion of the shaft further behind or closer to the plane of the surface of the head assembly and, therefore, causes the roller or guide mounted on the eccentric portion of the shaft to move similarly, resulting in a change in the corresponding wrap angle of the tape in relation to the head assembly. When the desired wrap angle is achieved, the shaft should be restrained from further rotation by an appropriate friction or other locking means. Although the invention can be used with any type of tape head assembly, it is used to particular advantage with a flat contour tape recording head assembly. The invention provides a means for precisely adjusting the critical wrap angles between tape and head in situ, using signals off the tape itself. One advantage is greater control of wrap angle than is presently obtained. This leads to improved tolerance, which in turn allows the wrap angle to be adjusted to a lower value. Lower wrap angles result in less head and tape wear. Another advantage of the invention is that it eliminates the need to rely on mechanical gauges, etc., and so improves quality assurance. A method of adjusting a wrap angle in a tape system having a roller or guide position adjustment includes optionally setting the roller in a selected initial position then operating the tape system to generate an electrical signal in the head when the tape moves over the rollers and across the head assembly. The signal is monitored while the roller or guide is adjusted (preferably one at a time). There are numerous ways that the signal might be used in the adjustment process depending in part on the type of head and the electronics of the tape system. In either method of adjustment the signal generated by the tape running over the head is monitored to find the angle at which a sharp dropout of the signal when the wrap angle is being reduced or a reappearance of the signal if the angle is being increased. In either case this establishes a critical point (or trigger point) from which the correct adjustment position is determined. Once the desired wrap angle is achieved the shaft should be prevented from further rotation if necessary by an appropriate means, for example, tightening set screws, applying adhesives, etc. Preferably the system allows the wrap angle on each side of the head to be adjusted independently.

DESCRIPTION OF THE PREFERRED EMBODIMENTS

Figure 1:
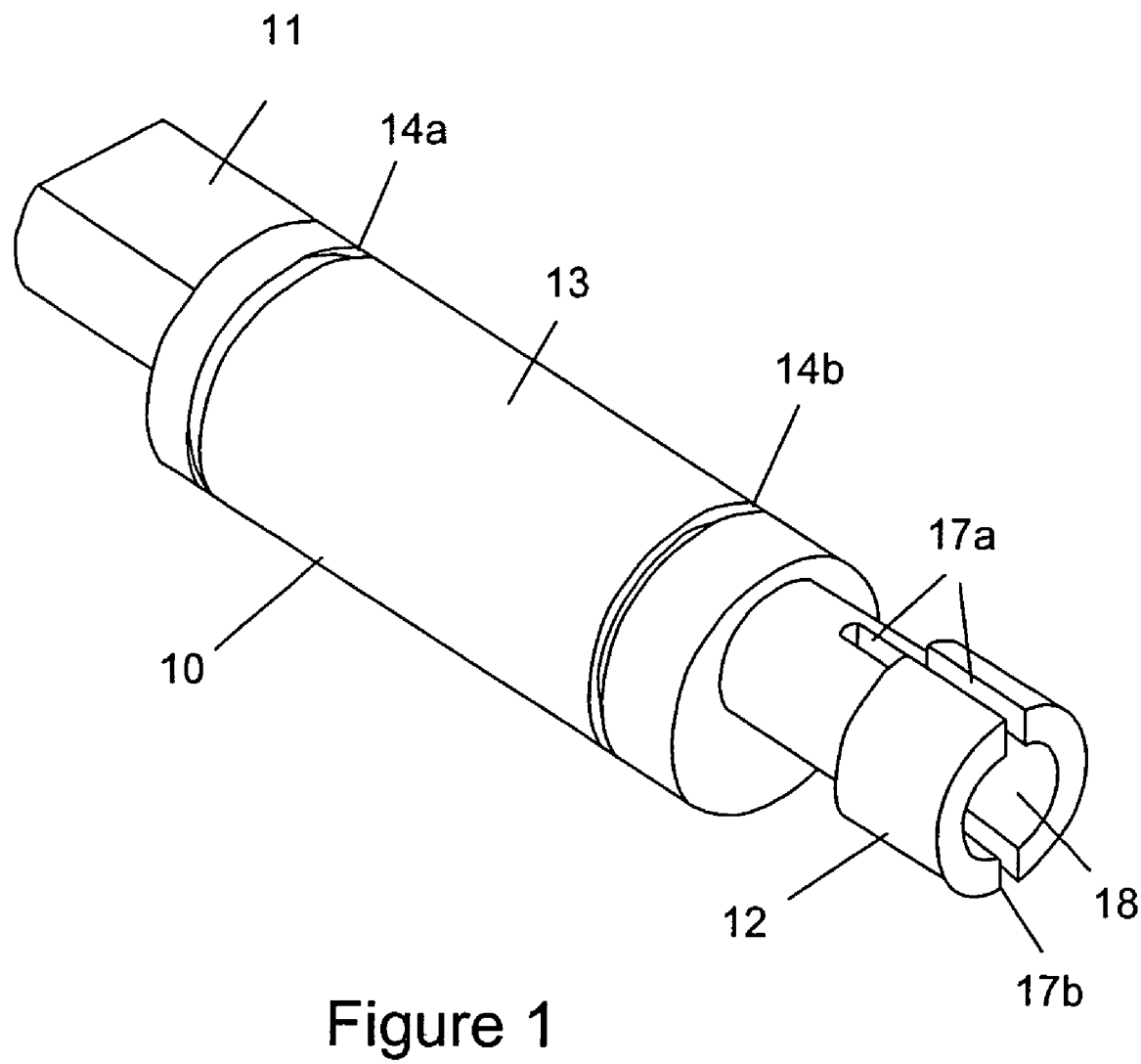
FIG. 1 is a perspective view illustrating an embodiment of the adjustable shaft of the invention with a split collet.

The method of the invention is preferably used in conjunction with a tape system having a head assembly with a flat contour air or tape bearing surface. In summary each of the preferred embodiments of the method is employed in the manufacturing process and/or the maintenance process for tape systems. External test, monitoring and/or optionally automated adjustment equipment are connected to the tape system to read a signal derived from the tape running across the head assembly. The wrap angle is varied to determine the angle at which the signal abruptly ceases or equivalently reappears. At this point there are two optional embodiments of the method. One uses the quality of the signal the determine the point at which the correct wrap angle has been achieved and the other uses the angle at which the signal drops out as the basis for determining the amount of offset needed to get to the correct angle by means of a lookup table or formula.

The method can be used in conjunction with any mechanism which allows adjustment of at least one of the wrap angles and is, therefore, not limited to use with the particular adjustment mechanism described herein. Using whatever adjustment means is provided and with the tape moving from the support to the head module under adjustment, the wrap angle is decreased or varied until the tape signal disappears, or as in the case described above, reappears—which will be called the "break point." The break point for a flat contour head with internally wrapped edges is sharply defined by the signal decreasing to zero (dropping out) when the wrap angle is reduced below a functional threshold for the head assembly or reappearing if the wrap angle is increasing from below a functional threshold. The wrap angle corresponding to the break point establishes the starting point for the adjustment of the desired wrap angle.

In one of the embodiments the next step in the adjustment process is to increase the wrap angle by a predetermined amount which is either a constant or is a variable value which is obtained by table lookup using the wrap angle corresponding to the break point. For example, the optimum wrap angle may be obtained when an adjustment mechanism, such as the eccentric shaft described below, is rotated theta degrees from the break point to move the roller or guide back from the plane of the air bearing surface of the head. The amount of the rotation needed may be different for the roller on the first side of the head than on the second side. If a table is used then there must be way for the operator to read the wrap angle corresponding to the break point. The table values are determined by the specifics of the particular tape system either experimentally or from design data. The operator (or automated system) looks up the break point angle in the table or computes it based on a mathematical algorithm to find the adjustment amount needed to achieve the desired wrap angle.

In another embodiment the next step in the adjustment process uses the signal derived from the tape to achieve the desired wrap angle. In this method the changes in the signal are observed as the wrap angle is increased. When the signal reaches the correct level, the wrap angle is correct.

One important advantage of each embodiment of the method is that they allow the wrap angle to be set using electrical signals generated by a tape running over the rollers and across the head. This allows the wrap angle to be adjusted to compensate at least in part for the specific manufacturing variations in each system.

For a two bumps on multibump head, the two external wrap angles are preferably set sequentially, i.e., one at a time. The internal wrap angles are fixed by the design of the head. Optionally the rollers or guides may be set in a selected initial position in order to allow the adjustment to begin from an approximate point. To generate an appropriate signal, magnetic tape is transported as is normal for the system running from the roller or guide to be adjusted across the head. The signal is derived from one or more read transducers on the "tape-in" side of the head, i.e., the side nearest the guide or roller which is being are adjusted. Since the adjustment is being performed at a functional system level, there are many points were the signal may be monitored. For example, the signal may be taken from a low level in the system either directly from the head or after only minimal processing has occurred. The signal may be also be taken at a higher level in the system after significant processing has occurred. It is also possible to use indirect indications of the signal condition which can be generated by the tape system's internal electronics, microprocessor(s) and/or firmware. For example, it is common for sophisticated tape systems to have special connectors which can be accessed to obtain status, maintenance or test information. The signal quality or amplitude can be monitored by the tape system's internal electronics and indicators (digital and/or analog) can be made available to test equipment.

Figure 2:
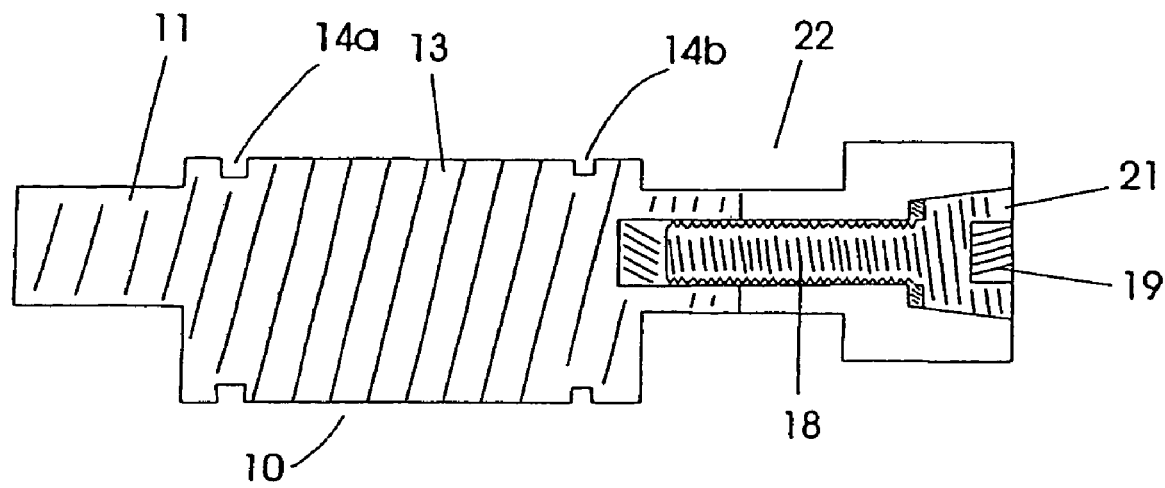
FIG. 2 is a section view illustrating an embodiment of the adjustable shaft of the invention with a split collet.

The system which will be described below includes an inventive feature allowing adjustment of the wrap angles with either flat surface heads or the more conventional curved surface heads. In one preferred embodiment the shaft 10 of the invention is made with a split collet 12 as shown in FIG. 1. The offset lower support end 11 of the shaft may be smaller in diameter than the roller support portion 31 but still concentrically aligned with the split collet to allow line of sight assembly. In general, however, the lower support end 11 does not have to lie within the circumference of the roller support portion and does not need to be cylindrical so long as it is able to rotate within the necessary limits. The roller support 13 is axially offset from the axis of the lower support end and the split collet. The roller support 13 has grooves 14*a*, 14*b* which allow retaining rings (not shown) to be installed to hold the roller (not shown) in the proper position on the shaft. Any other appropriate means for positioning and securing the roller can be used. The splits in the collet appear in FIG. 1 as 17*a* and 17*b*. The split collet has a bore which is tapped to receive a screw 19 which is sized in respect to the bore to force the split collet to expand when the screw is tightened or engaged inside the split collet. Either the bore, the screw head or both can be tapered to facilitate this. Sufficient clearances need to be maintained in the bore so that the screw does not bottom out before adequately expanding the collet. The embodiment shown has a reduced diameter "neck" 22 between' the split collet and the eccentric portion of the shaft. The split may extend into the neck as shown to provide added flexibility. FIG. 2 illustrates a cross section of the shaft of FIG. 1 and shows the bore 18 which receives screw 19.

The lower support end 11 and the split collet of the shaft of FIG. 1 fit into holes in a fixed support such as the chassis or base plate(s). The holes permit the shaft to he rotated but restrict radial end play for tape running stability. The collet end of the shaft is made accessible to an adjustment tool inserted by an operator. The splits 17*a*, 17*b* can also serve to engage an adjustment tool allowing rotation of the shaft for adjustment. Alternatively, a second slot, bosses, hexagonal surface, etc. can be used to engage an adjustment tool. To lock the shaft in position, a member such as a machine screw having a tapered head that engages the recess taper in the shaft can be inserted to engage the threads in the shaft and expand the top of the shaft upon tightening. Friction between the expanding top portion and the support hole clamps the shaft, thus preventing unwanted rotation of the shaft. Optionally, the outside surface of the collet can be modified to enhance the friction. The split collet can be on either end of the shaft and does not need to be on the same end having the feature which is used to turn the shaft. The split collet is only one way of providing for locking the shaft in place. Any other means for fixing the friction. The friction can be provided by the normal fit of the shaft its support and be relieved by compressing a split collet or pushing back a restraining member during the adjustment process.

Figure 7:
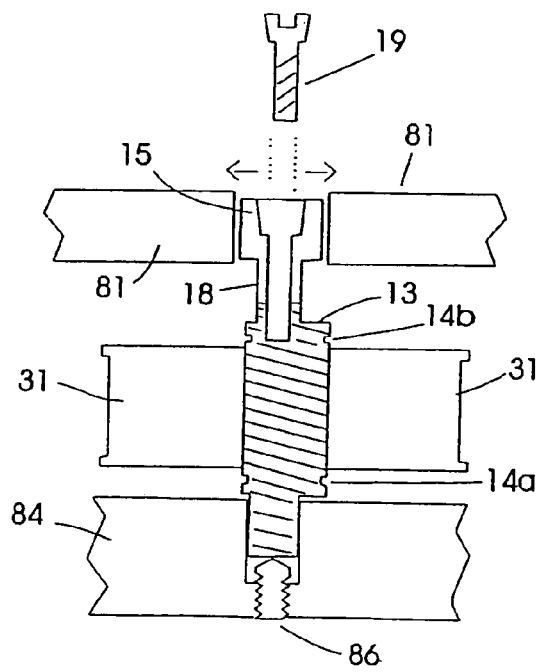
FIG. 7 is a section view illustrating the mounting of a shaft and roller of an embodiment of the invention in supporting members in a tape system.

FIG. 7 is a section view of the shaft with roller 31 mounted on the roller support portion of the thereon. The upper base plate 81 supports the collet 15 and the lower base plate 84 supports the shaft's lower support end 11 and an optional height adjustment screw 86. The grooves 14, 14*b* are designed to receive retaining rings which for clarity and simplicity are not shown.

Figure 3:
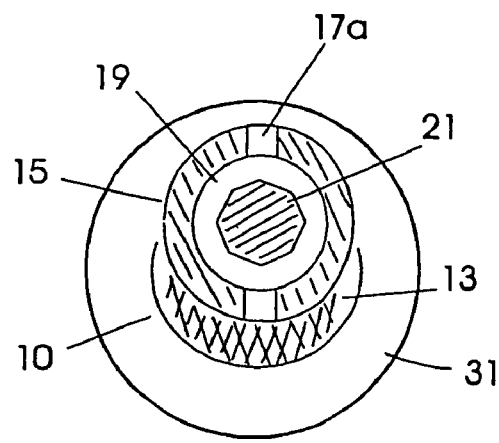
FIG. 3 is a top view illustrating an embodiment of the adjustable shaft of the invention with a split collet and having a roller mounted on the shaft.
Figure 4:
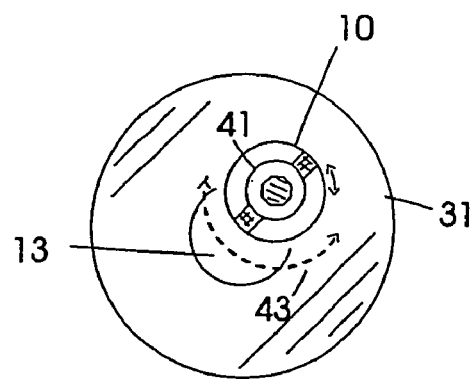
FIG. 4 is a top view illustrating the angular motion of the shaft and roller of an embodiment of the invention.
Figure 5:
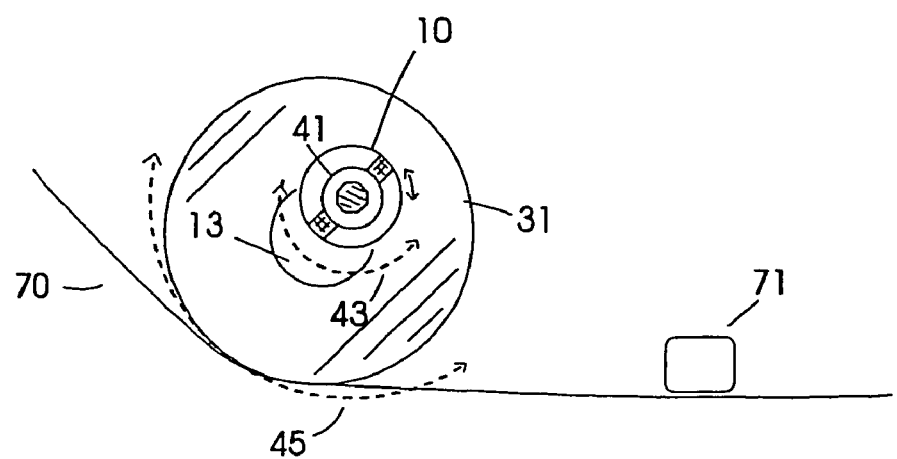
FIG. 5 is a top view illustrating the angular motion of the shaft and roller of an embodiment of the invention in relation to a tape head and tape contacting the roller.

FIG. 3 shows a top view of the shaft 10 with roller 31 mounted thereon. The roller 31 is closely fitted onto roller support 13 in this embodiment In FIG. 3 the offset of the split collet axis and the roller support axis has been exaggerated for illustrative purposes. FIG. 4 shows a view similar to FIG. 3, but effect of rotation of the shaft is illustrated. When the shaft 10 is rotated it turns around axis 41 and causes the roller support to move in an arc 43 around axis 41. Since roller 31 is mounted on and concentric with roller support 13, roller 31 moves in relation to axis 41 which is fixed in position by its support. FIG. 5 shows a similar view to FIG. 4, but includes the head assembly 71 and tape 70 with the tape 70 passing over roller 31 and across head assembly 71. Dotted arc 45 illustrates the movement of a point on the circumference of the roller in relation to head assembly 71 when shaft 10 is rotated. The movement of the roller along the arc in this way acts as a fine adjustment to the wrap angle of the tape.

Figure 6:
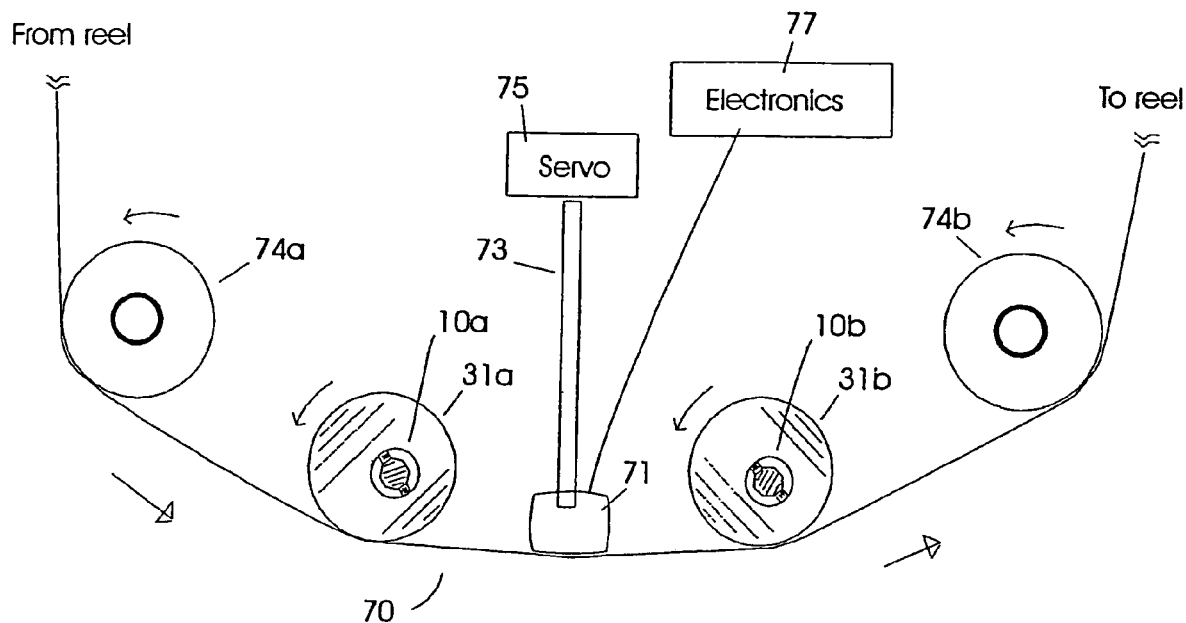
FIG. 6 is a top view illustrating the use of a shaft and roller of an embodiment of the invention on the tape-in and tape-out sides of a tape head in a tape system.

FIG. 6 illustrates a tape system with the adjustable roller positions. The tape 70 moves from reel to reel and can move in either direction, but is shown in the figure moving left to right. The tape passes over fixed roller 74*a* before passing over adjustable roller 31*a* which is mounted on eccentric shaft 10*a*. The adjustment of the position of adjustable roller 31*a* adjusts the first wrap angle. After traveling over the head assembly 71, the tape passes over adjustable roller 31*b* which is mounted on eccentric shaft 10*b*. The adjustment of the position of adjustable roller 31*b* adjusts the second wrap angle. Fixed roller 74*b* guides the tape toward the reel (not shown). The head assembly is mounted on an actuator 73 which is controlled by a servo system 75. The read and write signals to and from the head assembly are processed through electronics 77.

One important advantage of the adjustable roller position is that it allows the wrap angle to be set using electrical signals from a tape running over the rollers and across the head assembly. This allows the roller position to be adjusted to compensate at least in part for the specific manufacturing variations in each system.

The two wrap angles are preferably set one at a time. The rollers may be set in a selected initial position in order to allow the adjustment to begin with assurance that the tape is sufficiently wrapped to produce signals when the tape runs. To generate a selected signal, magnetic tape is transported as is normal for the system running from the roller to be adjusted across the head. The signal is monitored while the rollers are adjusted. Since the adjustment is being performed at a functional system level, there are many points were the signal may be monitored. The signal quality or amplitude can be monitored by the system and digital and/or analog indicators can be made available to test equipment connected to a maintenance connector. Thus, there are numerous ways that the signal to be used for the adjustment process might be selected depending on the particulars of the system. The type of head used in the system is also a factor, since the adjustment procedure is somewhat different for so-called flat contour heads and the more conventional convex heads.

Preferably for a flat contour head, the eccentric shaft is rotated to lift the tape off of the head, decreasing the wrap angle until tape signal disappears—which will be called the "break point." The break point for a flat contour head is sharply defined by the dropout of all signal including noise when the wrap angle is reduced below a functional threshold for the head. to establish a critical point (or trigger point) from which the correct adjustment of the position of the roller is determined. The next step in the adjustment process is preferably to rotate the eccentric shaft a predetermined amount which is either a constant or more accurately is a variable value which is obtained by table lookup using the angle of the break point to find the amount by which the shaft should be rotated. For example, the optimum wrap angle may be obtained when the eccentric shaft is rotated theta degrees from the break point to move the roller back away from the head. If the eccentric shaft is rotated in one direction to find the break point, then it will be rotated in the reverse direction to achieve the correct break angle. The amount of the rotation needed may be different for the roller on the first side of the head than on the second side. If a table is used then there must be way for the operator to read an angle corresponding to the break point. The adjustment tool described below can aid in obtaining this value.

For heads having a radius of curvature that is too small for the previously described method to work, (which will be referred to herein as "convex heads"), it is preferable to use the amplitude of a signal generated by the moving tape to make the adjustment. The signal may be noise from the tape, the servo signal or a specially recorded signal for the adjustment procedure. As indicated above there may be many choices in a particular system for points at which the amplitude of the signal may be probed. For this type of head, the tape should be well wrapped and moving from the head toward the guide—note that this is the opposite tape direction from that used for the flat heads. The wrap angle on one side of head is set by moving the roller on that side in relation to the head by rotating the shaft until the signal reaches a local maximum amplitude followed by a rapid drop-off. The wrap angle can then be set using a mathematical algorithm or a look up table based on this, or in some cases it can be set using the signal itself. Once the desired wrap angle is achieved for a particular roller, the shaft should be prevented from further rotation if necessary by tightening set screws, applying adhesives, etc.

Although not preferred, the method just described for use with convex heads, can also be used on flat heads. However, the method that is preferred for flat heads will not normally work for convex heads.

Alternatively the adjustments can be performed by automating any or all of the steps in the adjustment method.

The constant or the table values mentioned above need to be selected for each tape system design. In general ideal wrap angle varies from system to system. Some tape systems presently in the market have as high as a four degree wrap angle. It is desirable to minimize the wrap angle to reduce friction between the head and the tape to reduce wear, tape stress and electrification. If the wrap angle is too low, however, the system may be unreliable due to variations in the tape contact with the head. Thus, the wrap angle for a particular system can be selected within a small range as a design point which meets the specifications of the system for head wear, error rate, etc. Once a wrap angle and tolerance are selected, it is a straightforward process to calculate the angle of rotation of the eccentric shaft from the break point angle which will result in the design point wrap angle. The calculation uses the distance from the support points for the eccentric shaft to the head, the geometry of the eccentricity of the shaft and the roller geometry. The adjustable roller position allows a lower wrap angle to be used than has been possible in the prior art. For a flat contour head, a 1.5 to 2.0 degree wrap angle is achievable.

Figure 8:
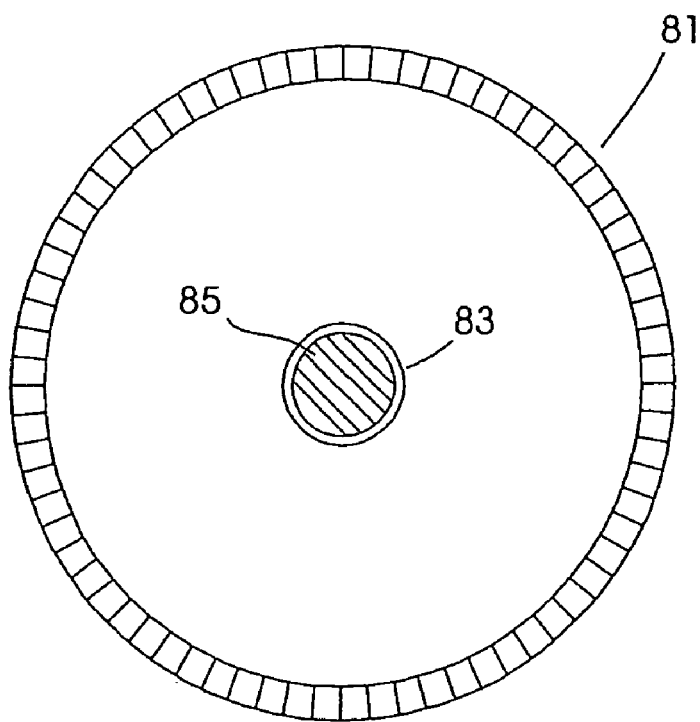
FIG. 8 is a top view illustrating an embodiment of an adjustment tool of the invention.
Figure 9:
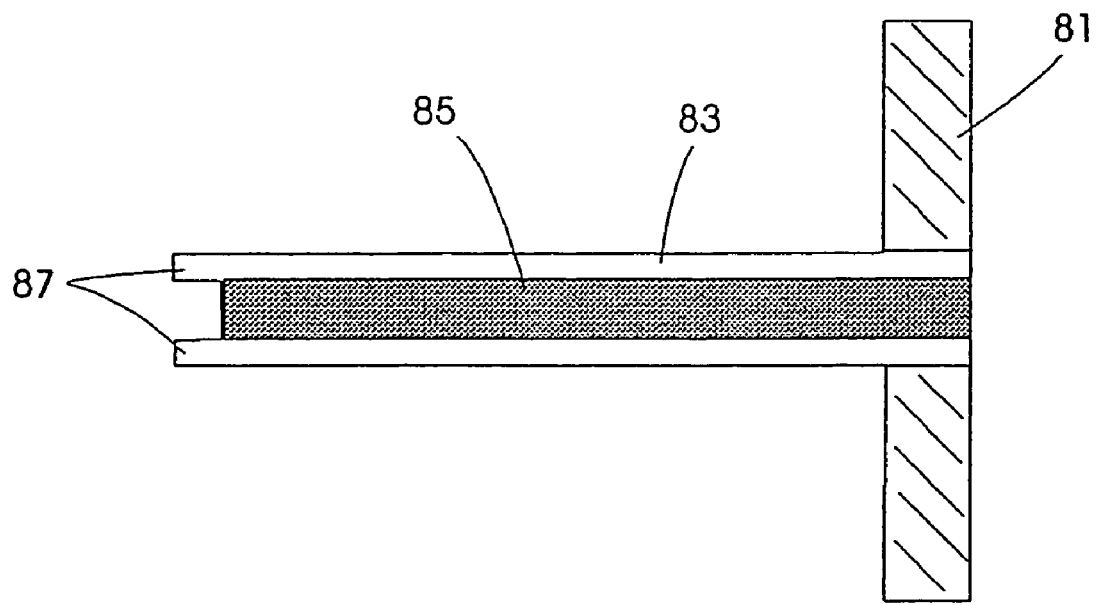
FIG. 9 is a central section view illustrating an embodiment of an adjustment tool of the invention.

Preferably the embodiment of the invention described above with the split collet in the top is used in conjunction with an adjustment tool which facilitates the unlocking, rotating and locking of the shaft and also provides an angular scale. One embodiment of such an adjustment tool is illustrated in FIGS. 8 and 9. FIG. 8 shows a top view of the tool which consists of a disk 91 with an angular scale marked on the circumference. A hollow, concentric rod 83 is attached in the center of the disk with the hollow area 85 of the rod being accessible from the top of the disk.

FIG. 9 illustrates a central section of the tool along the axis of the rod 83. The protrusions 87 on the end of the rod away from the disk are selected to mate with the slits 17a, 17b in the top of the collet to allow the tool to rotate the shaft 10. The rod 83 is sized with an outside diameter substantially the same as the outside diameter of the collet 12. The inside diameter of the rod, i.e., the hollow area 85, is sized substantially the same as the inside diameter of the recess in the screw 19 to allow access to turn the screw.

The adjustment tool is used by inserting the protrusions 87 on the hollow rod to engage the slots in the collet. An appropriate screw driver shaft is then passed through the hollow rod to engage and rotate the tapered head screw 19. The screw is shown with a faceted recess 21 for insertion of a driver tool to rotate the screw to tighten or loosen the screw, but any type of screw head may be used with a matching driver. The disk is held firmly to hold the collet in place while the screw is loosened with the driver. Then, tape is transported across the head to generate an adjustment signal and the adjustment occurs as described above. For the flat contour head the desired wrap angle is set by rotating the disk and using the angular scale to determine when the specified angle of theta degrees from the breakpoint has been achieved. For the convex head, the angular scale may or may not be useful. The eccentric shaft is locked by holding the disk and tightening the screw using the driver.

The inventions described above have been illustrated through particular embodiments, but many variations in the details to achieve equivalent results will known to practitioners of the art based on the teachings herein.

What is claimed is:

1. A data storage system, comprising:
    a first reel adapted for storing tape thereon;
    a second reel adapted for storing the tape thereon;
    a head assembly for at least reading data from the tape;
    electronics coupled to the head assembly for processing the data from the tape;
    a first tape guide assembly engaging the tape passing between the first reel and the head assembly, the first tape assembly being for setting a first wrap angle of the tape as the tape approaches the head assembly, the first tape guide assembly comprising:
    a guide for supporting the tape passing thereacross, the guide having a first axis;
    a shaft having opposite ends, the ends of the shaft being rotationally coaxial along a second axis, the shaft being rotatable about the second axis such that an angular position of the shaft can be adjusted, the second axis being offset from the first axis such that rotation of the shaft about the second axis moves the first axis in an orbital fashion about the second axis, the guide being positioned between the ends of the shaft; and
    a mechanism for preventing further rotation of the shaft when the angular position of the shaft is in a desired position.

2. The data storage system of claim 1 wherein the mechanism for preventing further rotation of the shaft includes one or more slits in a portion of the shaft which allows the shaft to flex outward to fixedly engage a support member.

3. The data storage system of claim 2 wherein the one or more slits are formed in one of the ends of the shaft, the end being formed to receive a threaded fastener and to flex outward when the threaded fastener is inserted.

4. The data storage system of claim 1 wherein the mechanism for preventing further rotation of the first shaft is selected from a group consisting of a set screw, an adhesive, and a mechanical friction coupling.

5. The data storage system of claim 1 wherein the guide includes a roller having a center of rotation coaxial with the first axis.

6. The data storage system of claim 1 wherein the head assembly does not perform full rotations.

7. The data storage system of claim 1 further composing a second tape guide assembly, the second tape guide assembly engaging the tape passing between the second reel and the head assembly, the second tape guide assembly being for setting a second wrap angle of the tape with respect to the head assembly.

8. The data storage system of claim 1 wherein the head assembly includes a flat contour tape head having a flat contour tape bearing surface.

9. A data storage sysytem, comprising:
a first reel adapted for storing tape thereon;
a second reel adapted for storing the tape thereon;
a nonrotating head assembly for at least reading data from the tape;
electronics coupled to the nonrotating head assembly for processing the data from the tape;
a first tape guide assembly engaging the tape passing between the first reel and the nonrotating head assembly, the first tape guide assembly being for setting a first wrap angle of the tape with respect to the nonrotating head assembly, the first tape guide assembly comprising:
a shaft having opposite ends and a support portion positioned between the ends, wherein the ends of the shaft lie along a first axis, the shaft being rotatable about the first axis such that an angular position of the shaft about the first axis can be adjusted, the support portion being offset from the first axis such that rotation of the shaft about the first axis moves at least part of the support portion in an orbital fashion about the first axis, and
a mechanism for preventing further rotation of the shaft when the angular position of the shaft is in a desired position.

10. The data storage system of claim 9 farther comprising a guide coupled to the support portion, the guide being for supporting the tape passing thereacross.

11. The data storage system of claim 10 wherein the guide is a roller.

12. The data storage system of claim 9 wherein the mechanism for preventing further rotation of the shaft includes one or more slits in a portion of the shaft which allows the shaft to flex outward to fixedly engage a support member.

13. The data storage system of claim 12 wherein the one or more slits are formed in one of the ends of the shaft, the end being formed to receive a threaded fastener and to flex outward when the threaded fastener is inserted.

14. The data storage system of claim 9 wherein the mechanism for preventing further rotation of the shaft is selected from a group consisting of a set screw, an adhesive, and a mechanical friction coupling.

15. The data storage system of claim 9 further comprising a second tape guide assembly, the second tape guide assembly engaging the tape passing between the second reel and the nonrotating head assembly, the second tape guide assembly being for setting a second wrap angle of the tape with respect to the nonrotating head assembly.

16. The data storage system of claim 9 wherein the nonrotating head assembly includes a flat contour tape nonrotating head having a flat contour tape bearing surface.

* * * * *